United States Patent
Berger et al.

(10) Patent No.: US 8,330,304 B2
(45) Date of Patent: Dec. 11, 2012

(54) SYSTEM AND METHOD FOR ASSEMBLY OF COMPONENT DEVICES INTO AN INFORMATION HANDLING SYSTEM

(75) Inventors: Karlene Berger, Austin, TX (US); James Utz, Round Rock, TX (US); James Gossett, Tow, TX (US)

(73) Assignee: Dell Products L.P., Round Rock, TX (US)

( * ) Notice: Subject to any disclaimer, the term of this patent is extended or adjusted under 35 U.S.C. 154(b) by 387 days.

(21) Appl. No.: 12/487,030

(22) Filed: Jun. 18, 2009

(65) Prior Publication Data

US 2010/0251271 A1  Sep. 30, 2010

Related U.S. Application Data

(63) Continuation-in-part of application No. 12/412,918, filed on Mar. 27, 2009.

(51) Int. Cl.
*G06F 1/16* (2006.01)
(52) U.S. Cl. .................... 307/326; 307/328; 361/679.41
(58) Field of Classification Search .................. 307/119, 307/326, 328; 361/679.09, 679.41; 720/601
See application file for complete search history.

(56) References Cited

U.S. PATENT DOCUMENTS

| | | | |
|---|---|---|---|
| 6,188,132 B1 | 2/2001 | Shih et al. | |
| 6,243,819 B1 * | 6/2001 | Jung | 713/320 |
| 6,813,147 B2 * | 11/2004 | Jeong | 361/679.06 |
| 7,024,674 B2 | 4/2006 | Shepherd et al. | |
| 7,137,128 B2 * | 11/2006 | Shimada et al. | 720/601 |
| 2008/0017620 A1 | 1/2008 | Sukhman et al. | |
| 2008/0055827 A1 * | 3/2008 | Homer et al. | 361/680 |
| 2010/0091442 A1 * | 4/2010 | Theobald et al. | 361/679.09 |

* cited by examiner

*Primary Examiner* — Daniel Cavallari
(74) *Attorney, Agent, or Firm* — Hamilton & Terrile, LLP; Robert W. Holland

(57) ABSTRACT

An information handling system component contained within an information handling system housing uses the information handling system housing as at least a portion of a safety enclosure for hazardous functions of the component. A lock out device disables the hazardous function if the information handling system housing is moved relative to the component. For example, an optical disc drive laser is disabled if a Hall effect sensor in the chassis of the optical disc drive no longer senses a magnet placed in a portion of the information handling system housing used to enclose the optical disc drive. Alternatively, the component couples to the information handling system housing to enclose the hazardous function within the interior of the information handling system housing so that the component is inaccessible from the exterior of the housing.

8 Claims, 4 Drawing Sheets

SYSTEM AND METHOD FOR ASSEMBLY OF COMPONENT DEVICES INTO AN INFORMATION HANDLING SYSTEM

RELATED APPLICATIONS

The present application is a continuation-in-part of application Ser. No. 12/412,918, filed Mar. 27, 2009, entitled "System and Method for Enclosing Information Handling System Component Devices" by James Utz, Kyle Spiess, Kevin Mundt, Karlene Berg, and sharing a common assignee.

BACKGROUND OF THE INVENTION

1. Field of the Invention

The present invention relates in general to the field of information handling system components, and more particularly to a system and method for assembly of component devices into an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically built in portable or stationary configurations. Portable information handling systems have smaller-sized housings that allow use of the system on the go. Integrated power, I/O and display devices support system operation free from permanent connections to external power and peripherals. Stationary information handling systems have housings of a wide variety of shapes and sizes that support use of the system in a fixed location. Desktop, tower and server information handling systems typically interface with external power and I/O devices. Manufacturers generally try to build information handling systems in as small a chassis as possible for the functionality supported by the information handling systems. Smaller sized stationary information handling systems are more convenient because a smaller footprint fits better in space-constrained locations, such as a user desk or a data center. Smaller sized portable information handling systems are more convenient for users since a smaller size and decreased weight make a portable information handling system less awkward to handle and less burdensome to carry. Generally, as an information handling system housing decreases in size, functionality also decreases because less room is available to fit in component devices and smaller space makes thermal transfer more difficult to accomplish.

Component devices used to build an information handling system include hard disk drives and optical drives, such as CD, DVD and BD drives, which store information for use in processing by a CPU or other processor. Some component devices are built in their own housing so that the component device housing fits within the information handling system housing. For example, optical drives that include one or more lasers to read and write information typically are built into a class 1 laser enclosed device housing. ANSI standards require that class 1 laser device housings have safety interlocks wherever the housing can be opened so that the laser within the device will not emit laser light that could injure an end user. The safety interlocks prevent emission of a beam of radiant energy above a minimum standard from leaving the laser or laser system. Service adjustments or maintenance work performed on the optical drive must not render the interlocks inoperative or cause exposure levels outside the housing to exceed the minimum standard unless the work is performed in an approved area with limited access and appropriate safeguards, supervision and control. The protective housing and optical drive must have a fail-safe design so that, if a failure occurs, the system will continue to meet the safety requirements for enclosed laser operations. The use of an optical drive housing within an information handling system housing tends to add to the size and weight of the information handling system.

SUMMARY OF THE INVENTION

Therefore a need has arisen for a system and method which encloses information handling system component devices and information handling systems in a common housing.

A further need exists for a system and method which assembles a component in an information handling system so that the component will not operate if disassembled from the information handling system.

In accordance with the present invention, a system and method are provided which substantially reduce the disadvantages and problems associated with previous methods and systems for enclosing information handling system component devices. At least a portion of a safety enclosure for an information handling system component is formed with a portion of the housing of the information handling system. A lock out device detects removal of the shared housing portion to disable one or more functions of the component.

More specifically, an information handling system is built from a plurality of electronic components, such as a CPU, RAM, a hard disk drive and chipset, which cooperate to process information. A component disposed in a housing of the information handling system performs one or more functions that call for a safety enclosure, such as an optical disc drive, which uses a laser to read and write information. A safety enclosure for the component is formed at least in part by a portion of the housing that encloses the information handling system, such as a side wall, a keyboard or a palm rest. A lock out device detects a breach of the safety enclosure, such as removal of the information handling system housing relative to a chassis of the optical disc drive. For example, a Hall effect switch disposed in the optical disc drive chassis detects proximity to a magnet integrated in the information handling system housing portion that forms a portion of the optical disc drive safety enclosure. For example, if a keyboard, palm rest or side wall of the information handling system housing proximate the optical disc drive is removed, movement of the magnet in the housing portion distal from the Hall effect sensor in the optical disc drive chassis causes the Hall effect sensor to command disablement of a laser in the optical disc drive.

In an alternative embodiment, a component chassis having a portion that includes a hazard has the hazard covered by coupling the hazardous portion coupled to a portion of the housing of the information handling system. For example, an optical drive chassis has a portion through which the laser of the optical drive might illuminate. To cover the portion through which the laser might illuminate, the chassis is coupled to a portion of the information handling system housing, such as a support for a keyboard. The optical drive couples with an attachment device, such as screws, that is inaccessible from the exterior of the information handling system housing after the housing is assembled to dispose the optical drive in its interior. For example, a keyboard support covers a portion of an optical drive chassis that presents a hazard of external laser illumination so that the laser cannot illuminate through the keyboard support. The keyboard support integrates with an information handling system housing to form a completed housing with an interior and an exterior. In order to obtain access to the optical drive, the keyboard support must be removed from the housing as screws coupling the optical drive to the keyboard support are inaccessible from the housing exterior. Removal of the keyboard support from the information handling system housing disconnects power from the optical drive. Removal of the keyboard support from the optical drive also removes power from the optical drive to reduce the hazard presented by the laser.

The present invention provides a number of important technical advantages. One example of an important technical advantage is that the housing of an information handling system also serves as a safety housing of an internal component so that the weight and size of the internal component is reduced. A lock out device detects removal of the information handling system housing to lock out operation of one or more component functions in response to removal of the information handling system housing. In the case of an optical disc drive, a laser device internal to the optical drive is prevented from operation upon removal of a portion of the information handling system housing that also forms the optical disc drive housing. The information handling system housing forms an ANSI Class 1 Enclosure of the laser device. Combining the optical disc drive housing and information handling system housing reduces the size and weight of the information handling system for improved usability.

Another advantage of the present invention is that an information handling system housing portion forms the protective cover of a component at a hazardous regions, such as a region of an optical drive through which a laser might illuminate. The component couples to the housing portion with an attachment device disposed in the housing interior and inaccessible to the housing exterior so that the housing portion must be removed from the housing before the component is removed from the housing portion. Power disconnects from the component upon removal of the component and housing portion assembly from the housing. Power is also removed from the component upon removal of the housing portion so that the laser hazard is powered down. In the event that a replacement component is needed for an installed component, the replacement component is shipped with the housing portion attached to maintain a safe enclosure about the hazardous region. By using the housing portion to both form the housing of an information handling system and cover a hazardous portion of a component, the overall weight and size of the information handling system is reduced.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Forming a safety enclosure around an information handling system component with at least a portion of the housing of the information handling system limits the need for redundant enclosures of the component. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
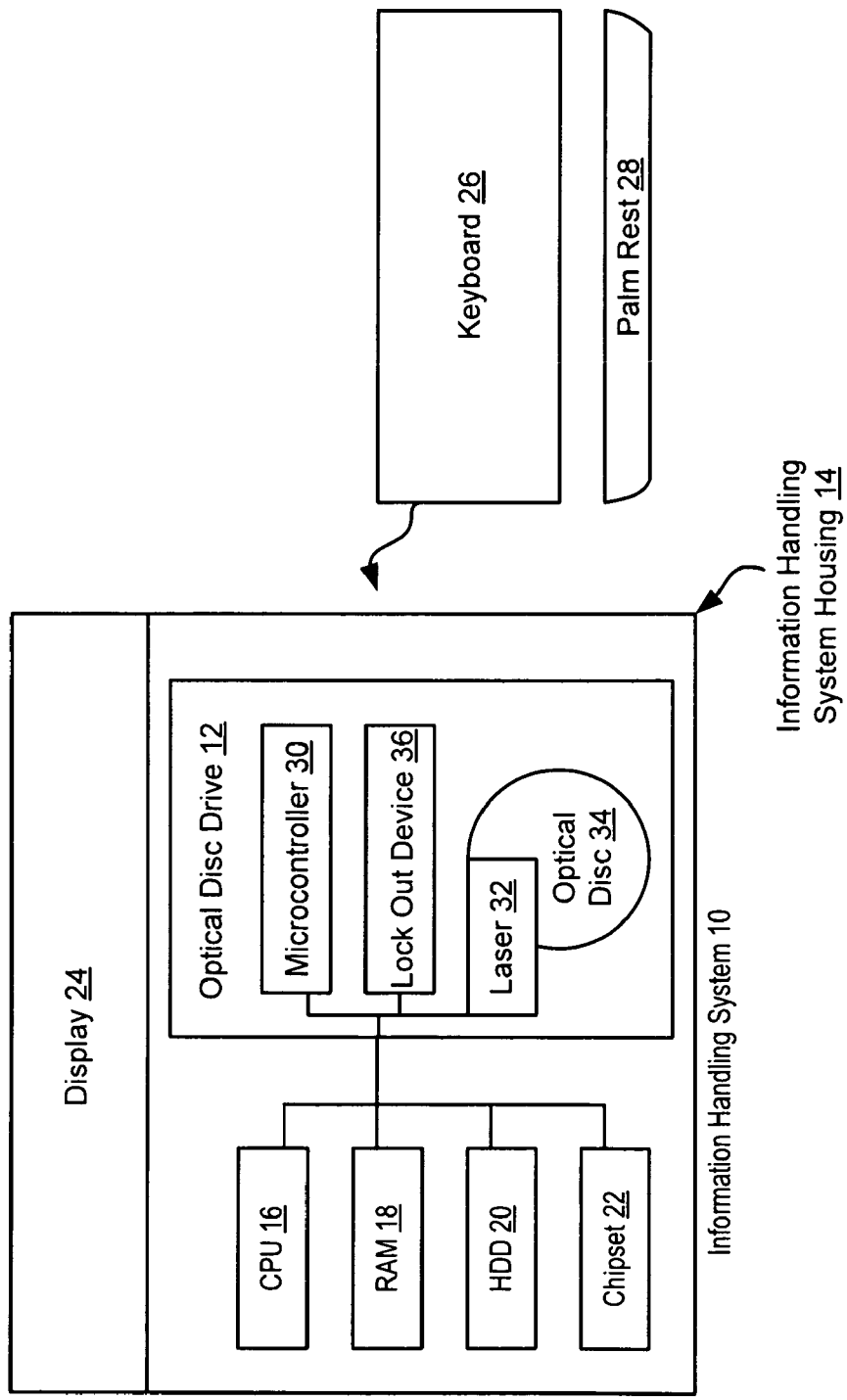
FIG. 1 depicts a block diagram of an information handling system having an internal component with a safety enclosure formed at least in part by portions of the information handling system housing.

Referring now to FIG. 1, a block diagram depicts an information handling system 10 having an internal component 12 with a safety enclosure formed at least in part by portions of the information handling system housing 14. In the example embodiment depicted by FIG. 1, internal component 12 is an optical disc drive. Information handling system 10 is built from a plurality of electronic components disposed in information handling system housing 14, such as a CPU 16 that processes information, RAM 18 that stores information for access by CPU 16, a hard disk drive 18 that provides permanent storage of information and a chipset 20 that coordinates interaction of the electronic components to process information. Information handling system 10 includes an integrated display 24 that presents information as visible images. A keyboard 26 fits over the top of the electronic components and accepts end user inputs. A palm rest 28 near keyboard 26 provides a resting surface for an end user during typing at keyboard 26.

Optical disc drive 12 has a microcontroller 30 that controls a laser 32 for illumination of an optical disc 34 during information reads and writes. Laser 32 is, for example, an infrared laser that reads and writes to CD optical media, a red laser that reads and writes to DVD optical media or a blue laser that reads and writes to BD optical media. Optical disc drive 12 is an ANSI Class 1 Enclosure that must restrict illumination of laser 32 if an end user is at risk of exposure to the illumination. In order to limit end user exposure to illumination by laser 32, keyboard 26 and palm rest 28 rest across the upper surface of optical disc drive 12 so that information handling system housing 14 includes keyboard 26 and palm rest 28 and forms at least a portion of the safety enclosure around optical disc drive 12 to protect end users from exposure to illumination by laser 32 during operation of optical disc drive 12. A lock out device 36 detects the presence of keyboard 26 and palm rest 28 to restrict operation of laser 32 in the event of removal of keyboard 26 and palm rest 28. If keyboard 26 or palm rest 28 are removed, thus breaching the safety enclosure around optical disc drive 12, disabling of laser 32 maintains optical disc drive 12 within the requirements for ANSI Class 1 enclosures. In alternative embodiments, information handling system housing 14 forms all or other portions of optical disc drive 12's safety enclosure. In other alternative embodiments, other types of components having a variety of functions have a safety enclosure defined by information handling system housing 14, such as hard disk drives. Lock out device 36 disables one or more of the functions as desired to maintain a desired safety standard. Forming a safety enclosure of an internal component with the information handling system housing 14 reduces weight and footprint by limiting or eliminating the need for a separate housing around the component to form the safety enclosure.

Figure 2:
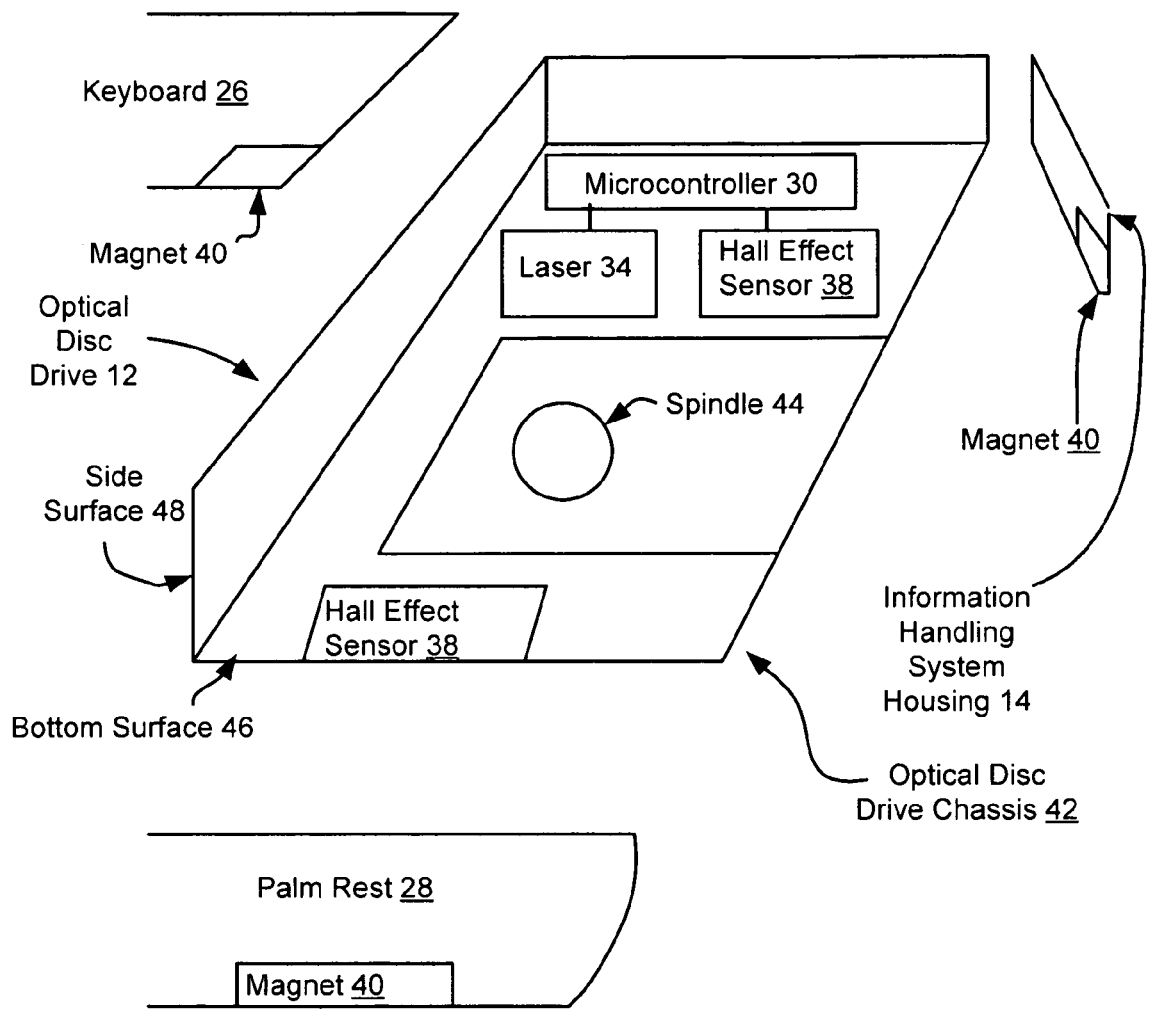
FIG. 2 depicts a block diagram of an optical disc drive having a safety enclosure formed at least in part by information handling system housing portions.

Referring now to FIG. 2, a block diagram depicts an optical disc drive 12 having a safety enclosure formed at least in part by information handling system housing portions 14, 26 and 28. In the example embodiment depicted by FIG. 2, lock out device 36 is built from a Hall effect sensor 38 disposed in optical disc drive 12 and a magnet 40 disposed in portions of information handling system housing 14 that form a safety enclosure about optical disc drive 12. Hall effect sensor 38 detects the presence of a magnet 40 and provides an enable signal to microcontroller 30 when in proximity to a magnet 40. When microcontroller 30 has an enable signal, microcontroller 30 allows application of power to laser 32; when microcontroller 30 loses the enable signal, microcontroller 30 disables one or more functions of optical disc drive 12. For example, in the absence of an enable signal, microcontroller 30 disables laser 32 but allows operation of other functions, such as spin at spindle 44. Disabling laser 32 in the absence of an enable signal from Hall effect sensor 38 ensures that laser 32 will not operate if a safety enclosure formed by information handling system housing 14 is breached. Requiring an enable signal by Hall effect sensor 38 fails optical disc drive 12 to a safe condition in the event of a failure of Hall effect sensor 38.

As depicted in the example embodiment of FIG. 2, multiple magnets 40 and Hall effect sensors 38 may be used to monitor the enclosure about optical disc drive 12. Optical disc drive chassis 42 contains the operational components of optical disc drive 12 within a bottom surface 46 and two side surfaces 48. A portion of information handling system housing 14 forms another side surface of optical disc drive 12 with a magnet 40 aligned with a Hall effect sensor 38. Removal of the side portion of information handling system housing 14 to remove magnet 40 from proximity to Hall effect sensor 38 will result in disablement of laser 32. The upper surface of optical disc drive 12 is formed by keyboard 26 and palm rest 28, each of which have a magnet 40 proximate a Hall effect sensor 38. If keyboard 26 or palm rest 28 are removed from their assigned positions over optical disc drive 12, the loss of the enablement signal from Hall effect sensor 38 causes microcontroller 30 to disable laser 32. In alternative embodiments, the loss of the enablement signal can cause microcontroller 30 to remove power from other functions of optical disc drive 12. In one alternative embodiment, magnet 40 is placed in optical disc drive chassis 42 and Hall effect sensors are placed in housing portions 14, 26 or 28 to command removal of power to optical disc drive 12 by components within information handling system 10. Optical disc drive chassis 42 can form a portion of the safety enclosure about optical disc drive 12 or, alternatively, the entire safety enclosure can be formed my information handling system housing 14. In another alternative embodiment, specific portions of information handling system components form the safety enclosure, such as a keyboard deflection plate that rests underneath the keyboard to provide physical support during use of the keyboard. Alternatively, the safety enclosure is formed by components, such as a PCIMCIA card, an Express card, a hard disk drive, a battery or other components that are proximate the laser drive. In other alternative embodiments, other types of lock out devices 36 may be used, such as a physical switch that is engaged by proximity of housing 14 to optical disc drive 12 or other types of proximity sensors.

Figure 3:
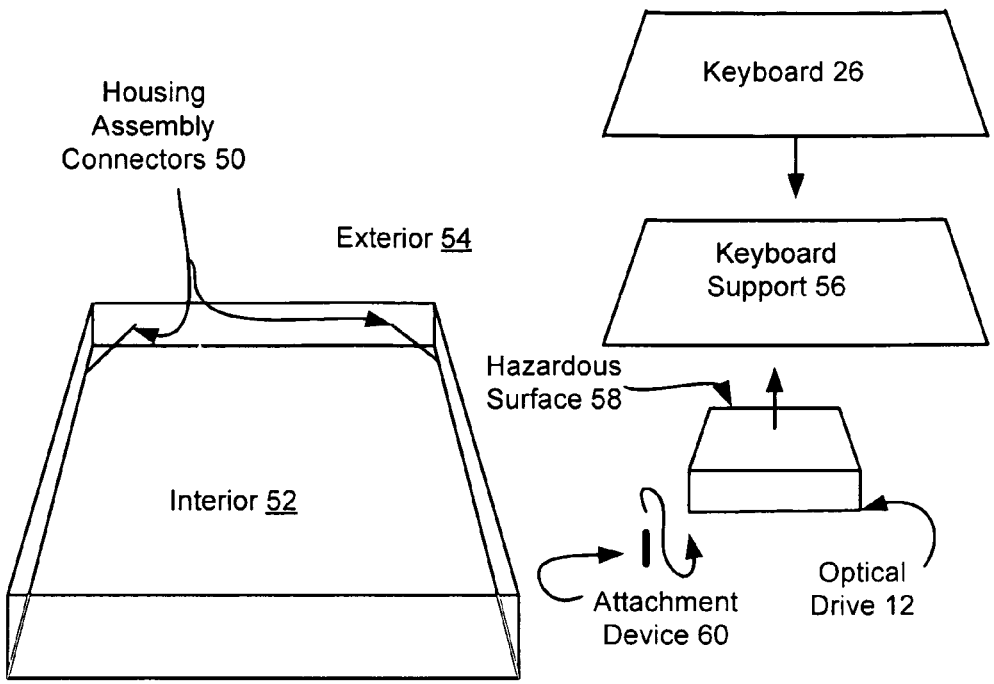
FIG. 3 depicts a block diagram of a blown-up view of an information handling system housing having a component coupled to a housing portion that covers a component hazardous surface.

Referring now to FIG. 3, a block diagram depicts a blown-up view of an information handling system housing 14 having a component coupled to a housing portion that covers a component hazardous surface. Housing 14 has housing assembly connectors 50, such as screws or other fasteners, in an interior 52 that are inaccessible from an exterior 54 except through an open top portion that a keyboard support 56 covers. Keyboard support 56 forms an upper casing to housing 14 so that when keyboard support 56 assembles to housing 14, housing assembly connectors 50 are inaccessible from the exterior 54 of housing 14. In alternative embodiments, keyboard support 56 may cover all or only a portion of the upper opening of housing 14 and may be separate from or integrated with a keyboard 26. Keyboard support 56 provides sufficient stiffness across the upper exterior surface of housing 14 so that end user inputs at keyboard 26 do not impact the operation of components within housing 14.

A component having an associated hazard couples to keyboard support 56 so that keyboard support 56 covers or otherwise protects against the component hazard. In the example embodiment depicted by FIG. 3, the component is an optical drive 12 having a laser that might emit energy through a hazardous surface 58. Optical drive 12 couples hazardous surface 58 to keyboard support 56 with attachment devices 60 so that keyboard support 56 acts as a cover that protects against laser emissions from optical drive 12. Attachment device 60 couples optical drive 12 to keyboard support 56 so that, upon assembly to housing 14, attachment device 60 is inaccessible from the exterior of housing 14. In order to access optical drive 14, keyboard support 56 must be removed from housing 14 since other ways of disassembly of housing 14 require removal of keyboard support 56. In this way, hazardous surface 58 of optical drive 12 remains inaccessible until keyboard support 56 is removed from information handling system housing 14. Attachment device 60 is, for example, screws that assemble optical drive 12 to housing support 56 so that, upon assembly of housing 14, both optical drive 12 and attachment device 60 are inaccessible from exterior 54 of housing 14. In alternative embodiments, different types of attachment devices may be used that will discourage removal of keyboard support 56 from hazardous surface 58, such as screws with heads that have less common shapes or permanent attachment devices, such as glue or rivets that are not designed to allow removal. In the event that a replacement of the component is required, the component is replaced with another component that already has keyboard support 56 attached so that hazardous surface 58 is not exposed during the replacement process.

Figure 4:
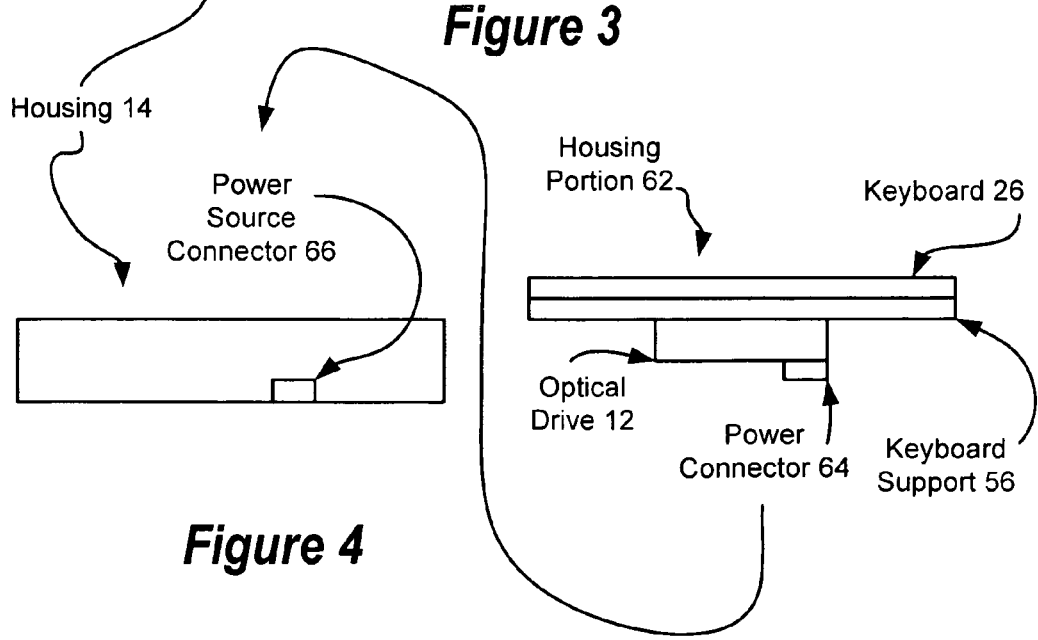
FIG. 4 depicts a block diagram of assembly of a housing portion to an information handling system housing so that the housing provides a protective enclosure for a hazard of the component.

Referring now to FIG. 4, a block diagram depicts assembly of a housing portion 62 to an information handling system housing 14 so that the assembled housing 14 provides a protective enclosure for a hazard of the component coupled to housing portion 62. Housing portion 62 includes a keyboard 26 coupled to a keyboard support 56 and a component, which in the example embodiment of FIG. 4 is an optical drive 12. Optical drive 12 has a power connector 64 that aligns with a power source connector 66 in housing 66. Housing portion 62 is placed over housing 14 and coupled into place so that power connector 64 obtains power from power source connector 66 when housing portion 62 is in place. Removal of housing portion 62 from housing 14 automatically disconnects power from optical drive 12 to reduce the risk of inadvertent illumination of a laser from optical drive 12. In one alternative embodiment, power is removed from the laser of optical drive 12 if optical drive is separated from keyboard support 56, such as by tripping a switch at separation of keyboard support 56 from optical drive 12 or detection of separation using a Hall effect sensor 38 as is set forth in FIG. 2.

Figure 5:
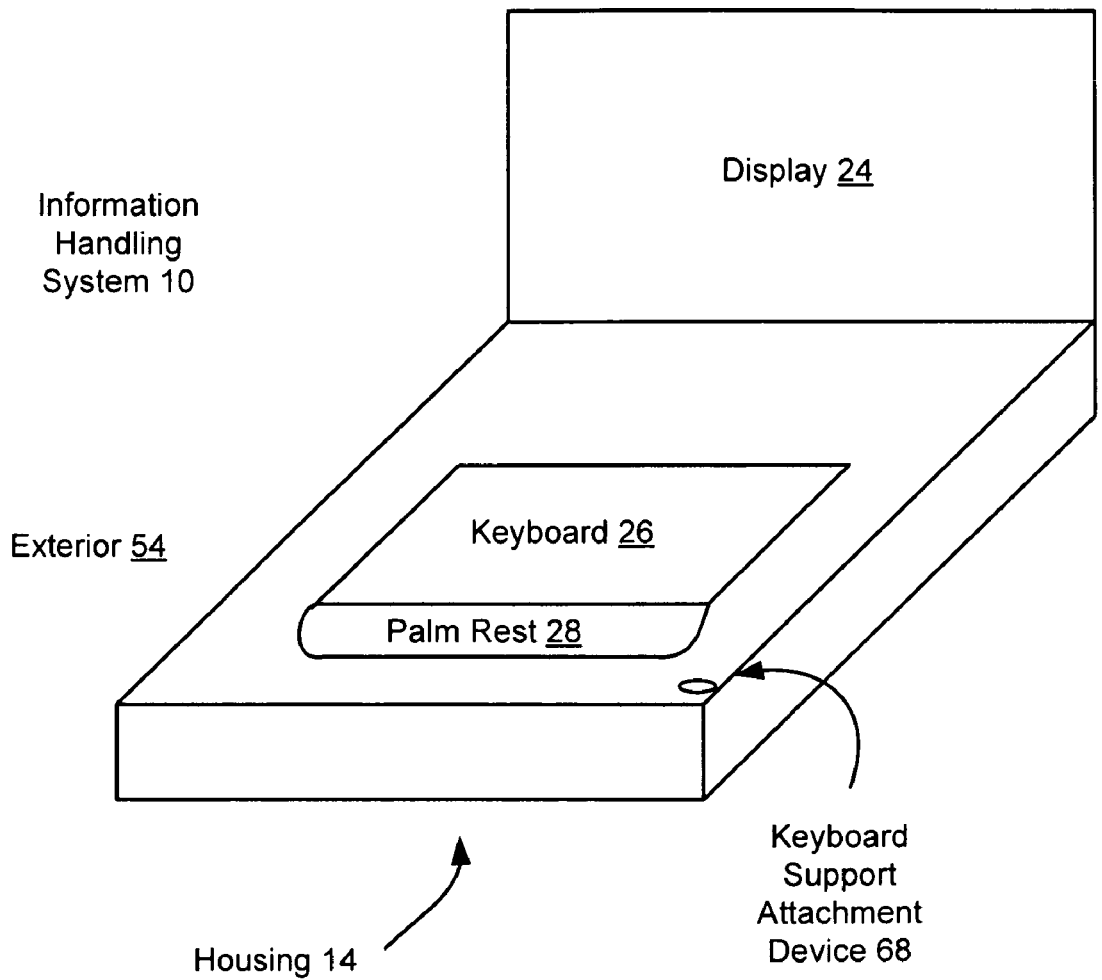
FIG. 5 depicts an information handling system having a component hazard enclosed in a housing that keeps the hazard inaccessible from the housing exterior.

Referring now to FIG. 5, an information handling system 10 is depicted having a component hazard enclosed in a housing 14 that keeps the hazard inaccessible from the housing exterior 54. The component, such as an optical drive, is enclosed in information handling system housing 14 so that housing 14 acts as the safety enclosure of the component. The component is inaccessible from exterior 54 of housing 14 unless housing 14 is disassembled, such as by removing keyboard support attachment devices 68 at the exterior 54 of housing 14. The portion of housing 14 that couples to and covers a hazardous surface of the component is the first portion of the housing to disassemble so that the component is removed with the housing portion before the interior of the housing is accessible. By using the housing 14 of information handling system 10 as a safety enclosure of the component, the size of the component and the information handling system are each reduced.

Although the present invention has been described in detail, it should be understood that various changes, substitutions and alterations can be made hereto without departing from the spirit and scope of the invention as defined by the appended claims.

What is claimed is:

1. An information handling system component comprising:
    plural electronic devices disposed in a component chassis, at least one device having a hazard associated with one portion of the component chassis; and
    a portion of a housing that encloses an interior of the information handling system, the portion coupled to the component chassis, the portion sized to couple to one or more other housing portions to form the housing with the component disposed in the housing interior;
    wherein the portion of a housing prevents access to the hazard unless the portion of a housing is completely decoupled and removed from the component chassis.

2. The information handling system component of claim 1 wherein the electronic devices comprise a laser and the device having the hazard comprises a laser.

3. The information handling system component of claim 1 wherein the portion of the housing comprises a support for a keyboard.

4. The information handling system component of claim 1 further comprising a power connector aligned to connect with a power supply of the information handling system when the portion of the housing couples to the other housing portions and to disconnect when the portion of the housing decouples from the other housing portions.

5. An information handling system comprising:
    a housing having plural portions, the plural portions assembling to form an exterior and an interior;
    a processor disposed in the housing interior;
    a component disposed in the housing interior and interfaced with the processor, the component having a hazardous portion that must have a cover for the component to operate in compliance with one or more safety constraints;
    wherein one of the housing portions fixedly couples to the component hazardous portion to cover the hazardous portion from any exposure at the housing exterior unless the component is removed from the housing interior to the housing exterior; and
    wherein the one or more safety constraints prohibit operation of the component if the hazardous portion is exposed.

6. The information handling system of claim 5 further comprising:
    an attachment device fixedly coupling the one of the housing portions to the component hazardous portion, the attachment device disposed in the housing interior, the attachment device preventing removal of the one of the housing portions from the component hazardous portion unless the component is removed from the housing interior.

7. The information handling system of claim 5 further comprising a power connector disposed on the component and aligned to connect with a power supply of the housing when the one portion of the housing assembles to the other of the plural housing portions and to disconnect when the one portion of the housing disassembles from the other of the plural housing portions.

8. The information handling system of claim 5 wherein the safety constraints comprise a prohibition against illumination of a laser of the optical drive except in a contained area and the one housing portion coupled to cover the hazardous portion defines the contained area.

* * * * *